US012524056B2

(12) United States Patent
Gourari et al.

(10) Patent No.: US 12,524,056 B2
(45) Date of Patent: Jan. 13, 2026

(54) ETHERNET MEDIA CONVERTER APPARATUSES AND SYSTEMS

(71) Applicant: Zemfyre Inc., Thornhill (CA)

(72) Inventors: Alexandre Gourari, Toronto (CA); Yuri Luskind, Thornhill (CA)

(73) Assignee: Zemfyre Inc., Thornhill (CA)

( * ) Notice: Subject to any disclaimer, the term of this patent is extended or adjusted under 35 U.S.C. 154(b) by 170 days.

(21) Appl. No.: 18/135,131

(22) Filed: Apr. 15, 2023

(65) Prior Publication Data

US 2024/0345642 A1    Oct. 17, 2024

(51) Int. Cl.
*G06F 1/3203* (2019.01)
*H04L 12/10* (2006.01)

(52) U.S. Cl.
CPC ............ *G06F 1/3203* (2013.01); *H04L 12/10* (2013.01)

(58) Field of Classification Search
None
See application file for complete search history.

(56) References Cited

U.S. PATENT DOCUMENTS

| 9,092,208 | B2 * | 7/2015 | Schlichter | ............... | G06F 1/266 |
| 2009/0063874 | A1 * | 3/2009 | Diab | ........................ | G06F 1/266 |
| | | | | | 713/300 |

| 2009/0322299 | A1 * | 12/2009 | Michishita | ............ | H02M 3/156 |
| | | | | | 323/282 |
| 2011/0095803 | A1 * | 4/2011 | Meijer | .................. | G06F 1/3296 |
| | | | | | 327/291 |
| 2018/0342955 | A1 * | 11/2018 | Tsai | ....................... | H02M 3/156 |

OTHER PUBLICATIONS

Stull. Isolated vs Non-Isolated Power Converters. [online]. Published online Dec. 3, 2019, 11 pages. [retrieved on Jun. 24, 2025]. Retrieved from <https://www.belfuse.com/resource-library/blog/isolated-vs-non-isolated-power-converters>.
Flex. Power Modules. Isolated vs non-isolated power converters: Isolation—the basics. Blog. Datasheet [online]. Published online Nov. 8, 2021, 7 pages. [retrieved on Jun. 24, 2025]. Retrieved from <https://flexpowermodules.com/isolated-vs-non-isolated-power-converters-an-overview>.

* cited by examiner

*Primary Examiner* — Kim Huynh
*Assistant Examiner* — Cole Jiawei Wentzel
(74) *Attorney, Agent, or Firm* — Marks & Clerk; Wilfred P. So

(57) ABSTRACT

Single Pair Ethernet (SPE) devices and conventional Ethernet devices configured for 2-pairs or 4-pairs of wires are not compatible with each other. A media converter is provided to interface between SPE devices and conventional Ethernet devices. The media converter is configured to also interface between a SPE device that transmits power over the SPE cable, also called Power over Data Lines (PoDL), and an Ethernet endpoint device that receives power over a Power over Ethernet (POE) cable. The media converter includes a SPE connector, a first transformer, a first PHY device, a second PHY device, a second transformer, a multi-pair Ethernet connector (e.g., RJ45 connector), a clock, and a power supply.

8 Claims, 11 Drawing Sheets

ETHERNET MEDIA CONVERTER APPARATUSES AND SYSTEMS

TECHNICAL FIELD

This application relates to providing an interface between Single Pair Ethernet (SPE) connections and conventional Ethernet connections, such as connections configured for 2 pairs or 4 pairs Ethernet data connections.

BACKGROUND

PoE (Power Over Ethernet) is well known and uses conventional Ethernet data cables, either configured as 2-pair or 4-pair, to deliver power to end nodes typically consisting of cameras, sensors, low-power actuators, door locks, small motors, etc. For example, a 2-pair Ethernet cable includes two twisted pairs of wires (e.g., four wires). In another example, a 4-pair Ethernet cable includes four twisted pairs of wires (e.g., eight wires). There are some Institute of Electrical and Electronics Engineers (IEEE) standards prescribing interoperability parameters, maximum power delivery, including for example the standards IEEE 802.3af, IEEE 802.3at, and IEEE 802.3bt.

FIG. 1 shows an example system 100 of two Ethernet devices connected by an Ethernet data cable, which may be a 2-pair Ethernet cable or a 4-pair Ethernet cable. The devices are powered by external power supplies. Electrical power sufficient to power a device is not transferred over the Ethernet data cable. The Ethernet data cable in some cases is a copper Ethernet cable configured as 100BASE-TX-2 pairs, or configured as 1000BASE-T-4 pairs.

Examples of Ethernet devices include Ethernet switches, camera devices, audio devices, computers, door locks, sensors, etc.

FIG. 2 shows an example system 200 of two Ethernet devices connected by an Ethernet cable configured for PoE. Ethernet Device #1 in the system 200 includes power sourcing equipment (PSE), which supplies power over the Ethernet cable. Data and power are transmitted to Ethernet Device #2, which includes a powered device (PD) for receiving the electrical power, and the electrical power is used to power the internal electronics in Ethernet Device #2. Ethernet Device #2 is considered an endpoint device that receives and consumer power, while also exchanging data. It will be appreciated that an Ethernet switch is not an endpoint device. Examples of Ethernet endpoint devices include camera devices, audio devices, door locks, sensors, etc.

FIG. 3 shows another example system 300 of two Ethernet devices connected by an Ethernet cable configured for PoE. Ethernet Device #2 is an endpoint device that requires power through the Ethernet cable, and Ethernet Device #1 is not equipped to supply power. Instead, the PSE is externally located to supply electrical power to the Ethernet cable.

Another type of Ethernet technology is called Single Pair Ethernet (SPE). Electrical power can also be transmitted or delivered over Single Pair Ethernet, which is called Power over Data Lines (PoDL).

FIG. 4 shows an example system 400 of two Ethernet devices connected by an Ethernet cable configured for PODL. An Ethernet data and power cable with one twisted pair of wires connects Ethernet Device #1 and Ethernet Device #2. Electrical power provided by a PSE in Ethernet Device #1 is delivered over the Ethernet cable and the electrical power is received by a PD in Ethernet Device #2.

SUMMARY

The following summary is intended to introduce the reader to various aspects of the detailed description, but not to define or delimit any singular embodiment.

In a first broad aspect, an apparatus comprises: an electronics subsystem comprising a SPE connector and a multi-pair Ethernet connector, the electronics subsystem configured to convert data transmitted between the SPE connector and the multi-pair Ethernet connector; and the electronics subsystem configured to receive power from an external power supply separately from the SPE connector and from the multi-pair Ethernet connector.

In some example cases of the first broad aspect, the electronics subsystem further comprises: a first transformer coupled to the SPE connector; a first PHY device coupled to the first transformer; a second PHY device coupled to the first PHY device; a second transformer coupled to the second PHY device; the multi-pair Ethernet connector coupled to the second transformer; a clock coupled to the first PHY device and the second PHY device; and a power supply coupled to the first PHY device, the second PHY device and the clock.

In some example cases of the first broad aspect, a system comprises the apparatus, and wherein the system further comprises: a first Ethernet device that is coupled to the apparatus through a SPE cable connected to the SPE connector; and a second Ethernet device coupled to the apparatus through a multi-pair Ethernet cable connected to the multi-pair Ethernet connector.

In a second broad aspect, an apparatus comprises: an electronics subsystem comprising a SPE connector and a multi-pair Ethernet connector, the electronics subsystem configured to convert data transmitted between the SPE connector and the multi-pair Ethernet connector; and an isolated power supply configured to receive an electrical power from an external power supply separately from the SPE connector and from the multi-pair Ethernet connector, and the isolated power supply configured to supply the electrical power for transmission out the multi-pair Ethernet connector.

In some example cases of the second broad aspect, the electronics subsystem further comprises: a first transformer coupled to the SPE connector; a first PHY device coupled to the first transformer; a second PHY device coupled to the first PHY device; a second transformer coupled to the second PHY device; the multi-pair Ethernet connector coupled to the second transformer; a clock coupled to the first PHY device and the second PHY device; a power supply coupled to the first PHY device, the second PHY device and the clock; a PoE controller coupled to the second transformer; and, wherein the isolated power supply is coupled to the PoE controller.

In some example cases of the second broad aspect, a system comprises the apparatus, and the system further comprises: a first Ethernet device coupled to the apparatus through a SPE cable connected to the SPE connector, the electronics subsystem of the apparatus configured to be powered by the external power supply; and a second Ethernet device coupled to the apparatus through a multi-pair Ethernet cable that is connected to the multi-pair Ethernet connector, and the multi-pair Ethernet cable is configured to transmit the data and the electrical power; and wherein the second Ethernet device comprises a second isolated power supply configured to receive the electrical power transmitted by the multi-pair Ethernet cable.

In a third broad aspect, an apparatus comprises: an electronics subsystem comprising a SPE connector and a multi-pair Ethernet connector, the electronics subsystem configured to convert data transmitted between the SPE connector and the multi-pair Ethernet connector; and an isolated PoDL power supply configured to receive a first electrical power that has been transmitted through the SPE connector, and the isolated PoDL power supply configured to power the electronics subsystem; and an isolated PoE power supply configured to receive an external electric power, and to generate and supply a second electrical power for transmission out from the multi-pair Ethernet connector.

In some example cases of the third broad aspect, the electronics subsystem further comprises: a first transformer coupled to the SPE connector; a first PHY device coupled to the first transformer; a second PHY device coupled to the first PHY device; a second transformer coupled to the second PHY device; a multi-pair Ethernet connector coupled to the second transformer; a clock coupled to the first PHY device and the second PHY device; a PoDL controller coupled to the SPE connector; a PoE controller coupled to the second transformer; wherein the isolated PoDL power supply is coupled to the PoDL controller, the first PHY device, the second PHY device and the clock; and wherein the isolated PoE power supply is coupled to the PoE controller.

In some example cases of the third broad aspect, a system comprises the apparatus, and the system further comprises: a first Ethernet device coupled to the apparatus through a SPE cable that is connected to the SPE connector of the apparatus, the first Ethernet device comprising a second isolated PoDL power supply; and a second Ethernet device coupled to the apparatus through a multi-pair Ethernet cable that is connected to the multi-pair Ethernet connector of the apparatus, the second Ethernet device comprising a second isolated PoE power supply.

In some example cases of the third broad aspect, the system further comprises a first external power supply coupled to the first Ethernet device, wherein the first external power supply powers the second isolated PoDL power supply and powers the electronics subsystem of the apparatus.

In some example cases of the third broad aspect, the system further comprises a second external power supply coupled to the apparatus, wherein the second external power supply powers the isolated PoE power supply of the apparatus and powers the second isolated PoE power supply of the second Ethernet device.

In a fourth broad aspect, an apparatus comprises: an electronics subsystem comprising a SPE connector and a multi-pair Ethernet connector, the electronics subsystem configured to convert data transmitted between the SPE connector and the multi-pair Ethernet connector; an isolated PoDL power supply configured to receive a first electrical power that has been transmitted through the SPE connector, and the isolated PoDL power supply configured to power the electronics subsystem; and, a non-isolated PoE power supply configured to receive the first electrical power that has been transmitted through the SPE connector, and the non-isolated PoE power supply configured generate and supply a second electrical power for transmission out from the multi-pair Ethernet connector.

In some example cases of the fourth broad aspect, the electronics subsystem further comprises: a first transformer coupled to the SPE connector; a first PHY device coupled to the first transformer; a second PHY device coupled to the first PHY device; a second transformer coupled to the second PHY device; the multi-pair Ethernet connector coupled to the second transformer; a clock coupled to the first PHY device and the second PHY device; a PoDL controller coupled to the SPE connector; a PoE controller coupled to the second transformer; wherein the isolated PoDL power supply is coupled to the PoDL controller, the first PHY device, the second PHY device and the clock; and wherein the non-isolated PoE power supply is coupled to the PoE controller and to the PoDL controller.

In some example cases of the fourth broad aspect, the non-isolated PoE power supply comprises: an input power line coupled to a bypass device, a boost converter, and a voltage comparator; the voltage comparator coupled to a logic inverter and the boost converter; the logic inverter is coupled to the bypass device; and the bypass device and the boost converter are coupled to an output power line.

In some example cases of the fourth broad aspect, the voltage comparator is configured to compare an incoming voltage value of the input power line with a threshold voltage value.

In some example cases of the fourth broad aspect, the input power line is associated with an input voltage range, the output power line is associated with an output voltage range, and the input voltage range partially overlaps the output voltage range.

In some example cases of the fourth broad aspect, a system comprises the apparatus, and the system further comprises: a first Ethernet device coupled to the apparatus through a SPE cable that is connected to the SPE connector of the apparatus, the first Ethernet device comprising a second isolated PoDL power supply; a second Ethernet device coupled to the apparatus through a multi-pair Ethernet cable that is connected to the multi-pair Ethernet connector of the apparatus, the second Ethernet device comprising a second isolated PoE power supply; and an external power supply is coupled to the first Ethernet device, and the external power supply powers the first Ethernet device, the apparatus, and the second Ethernet device.

In a fifth broad aspect, an apparatus comprises: an electronics subsystem comprising a SPE connector and a multi-pair Ethernet connector, the electronics subsystem configured to convert data transmitted between the SPE connector and the multi-pair Ethernet connector; and, an isolated power supply and a non-isolated power supply. The non-isolated power supply comprises: an input power line coupled to a bypass device, a boost converter, and a voltage comparator; the voltage comparator coupled to a logic inverter and the boost converter; the logic inverter is coupled to the bypass device; and the bypass device and the boost converter are coupled to an output power line.

In some example cases of the fifth broad aspect, the voltage comparator is configured to compare an incoming voltage value of the input power line with a threshold voltage value.

In some example cases of the fifth broad aspect, the input power line is associated with an input voltage range, the output power line is associated with an output voltage range, and the input voltage range partially overlaps the output voltage range.

BRIEF DESCRIPTION OF THE DRAWINGS

The drawings included herewith are for illustrating various examples of apparatuses and systems of the present specification and are not intended to limit the scope of what is taught in any way. In the drawings.

DETAILED DESCRIPTION

Compared to 2-Pair Ethernet technology and 4-Pair Ethernet technology, Single Pair Ethernet (SPE) technology is more recent, as are the attempts standardize power delivery over data lines (PoDL) using SPE. An example of a relatively more recent standard for SPE is the IEEE 802.3cg standard.

Both technologies offer, in principle, the same means to deliver electrical power to end nodes (also called end devices). However, the named inventors of this patent application have recognized that the newer SPE technology and the older 2-Pair and/or 4-Pair Ethernet technologies are largely incompatible with each other.

PoDL, also called Single-pair Power over Ethernet (SPoE), offers far greater distance to the end node compared to PoE. For example, PoDL (also herein interchangeably called SPOE) can deliver data and power over 1,000 meters, while PoE has a shorter delivery distance of 150 meters. In other words, PoDL power delivery can be much more usable than PoE.

However, the named inventors of this present application have also recognized that PoE is a much older technology with a large installation base, with numerous existing and new products equipped with PoE capability. The named inventors of this present application have further recognized that the combination of PoE and PoDL provides benefits. In some cases, these benefits include transmitting power and data over long distances while maintaining usability with devices with multi-pair Ethernet connectors.

Figure 1:
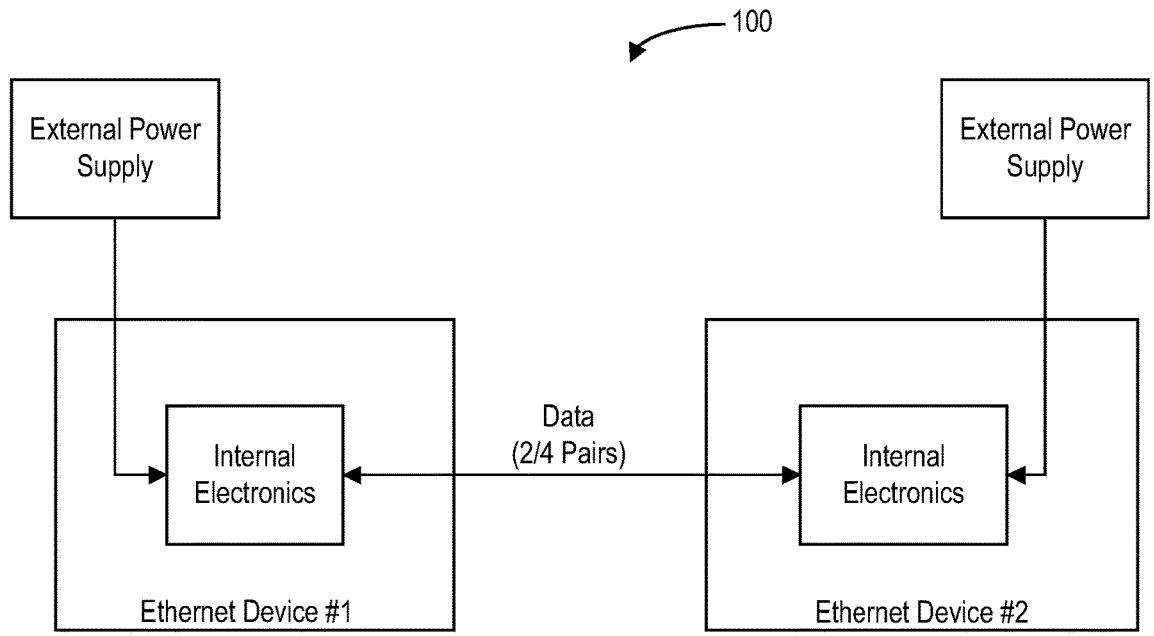
FIG. 1 is a block diagram of an example of an existing Ethernet communication system including two Ethernet devices.
Figure 2:
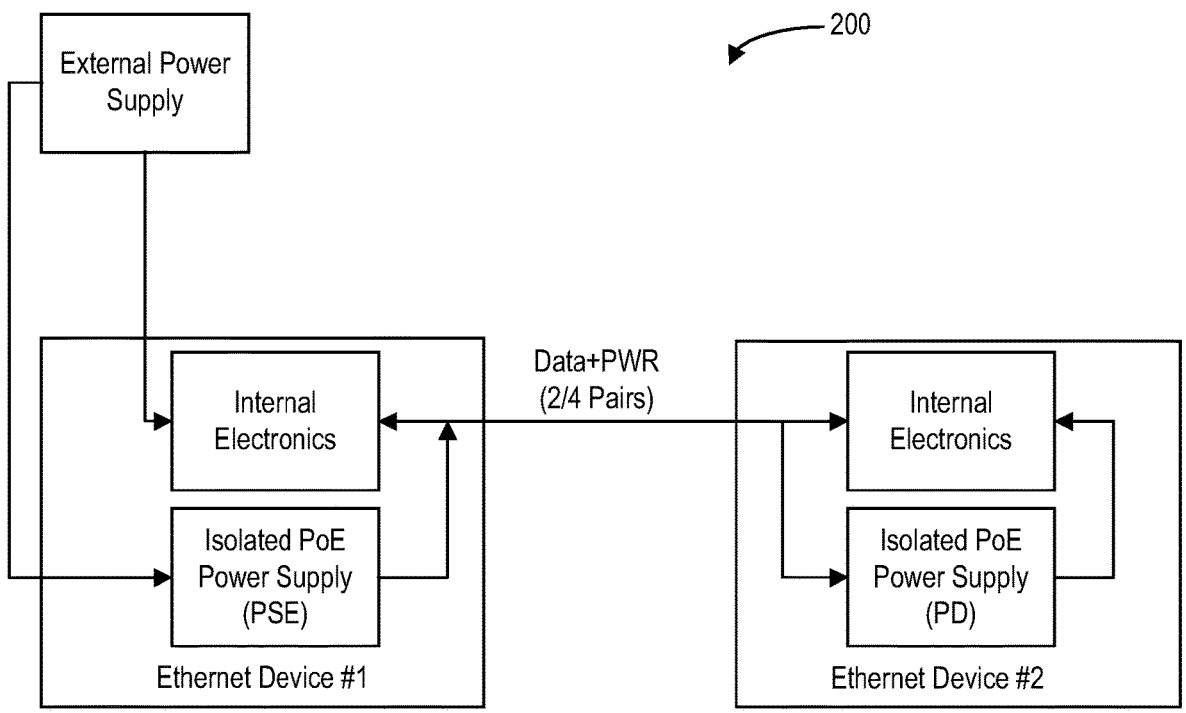
FIG. 2 is a block diagram of an example of an existing Ethernet communication system including two Ethernet devices, configured for PoE.
Figure 3:
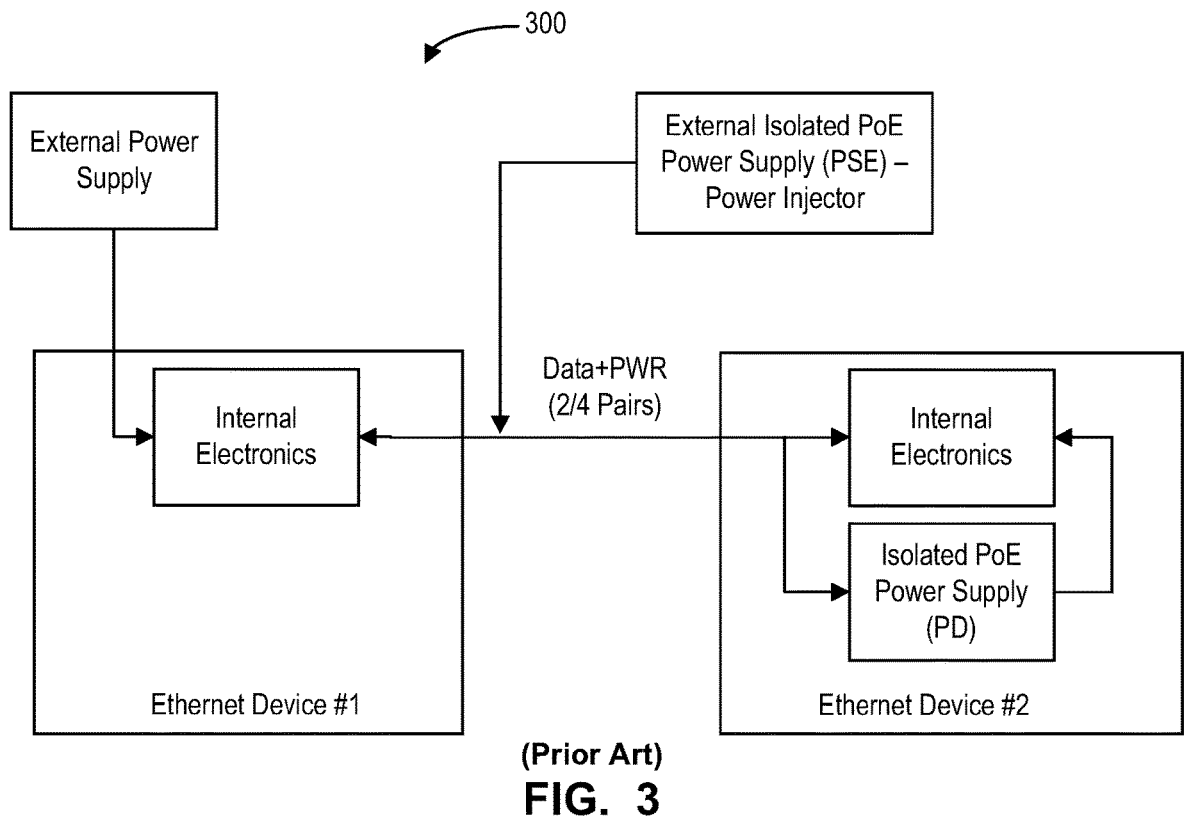
FIG. 3 is a block diagram of another example of an existing Ethernet communication system including two Ethernet devices, configured for PoE.
Figure 4:
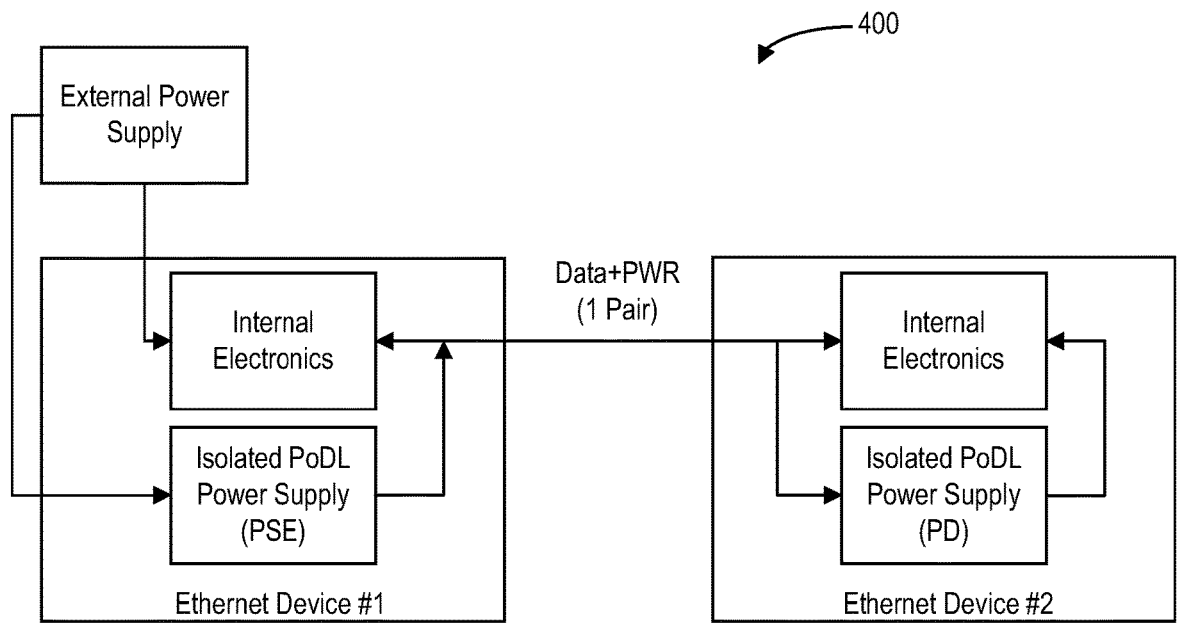
FIG. 4 is a block diagram of an example of an existing Ethernet communication system including two Ethernet devices connected by a SPE cable, configured for PoDL.
Figure 5A:
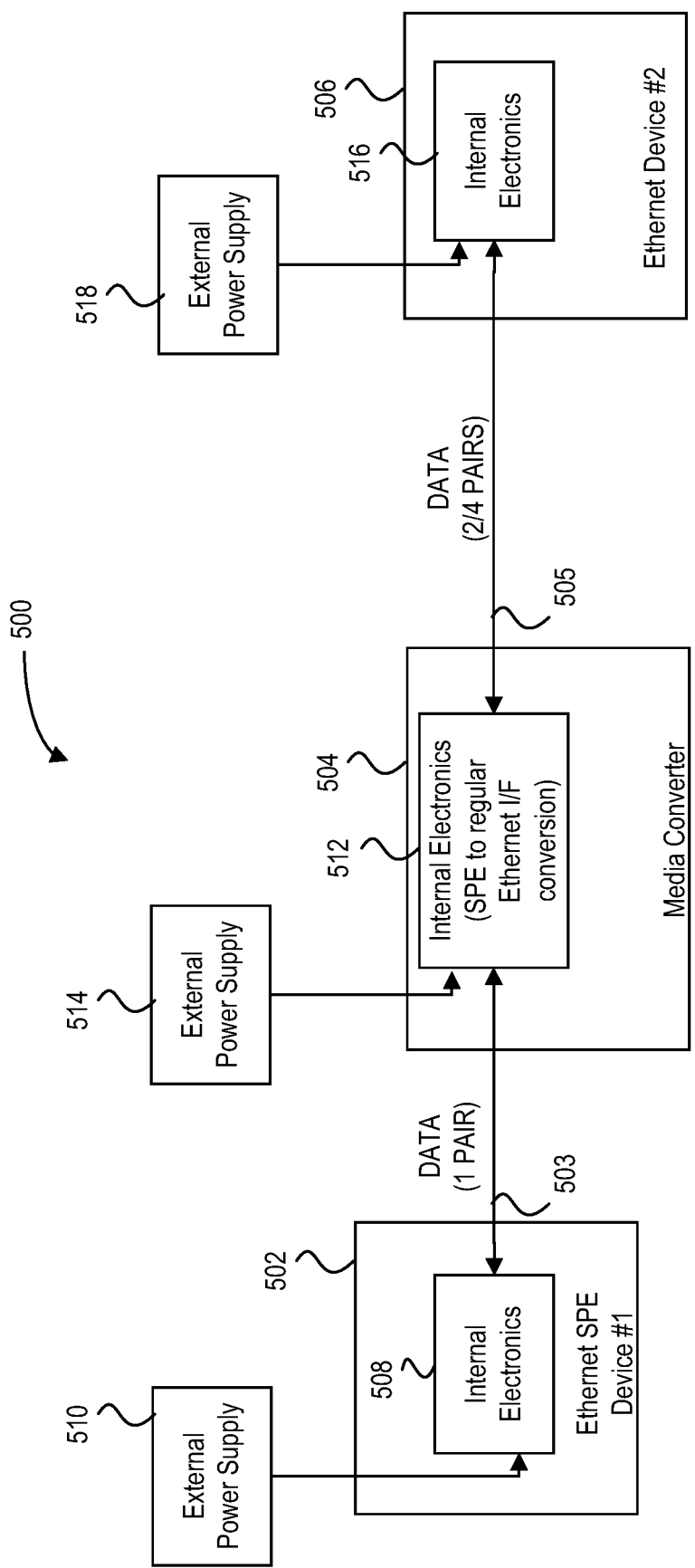
FIG. 5A is a block diagram of two Ethernet devices and a media converter interfacing between SPE technology and PoE technology in accordance with some embodiments.

Referring now to FIG. 5A, an example embodiment of a system 500 is provided that includes a first Ethernet device 502, a media converter 504, and a second Ethernet device 506. The first Ethernet device 502 is configured for SPE, and is herein also called an SPE device. In an example embodiment, the first Ethernet device 502 is an Ethernet switch.

A SPE data cable 503 is connected between the first Ethernet device 502 and the media converter 504, and data is transmitted therebetween. A 2-pair or a 4-pair Ethernet data cable 505 is connected between the media converter 504 and the second Ethernet device 506. The term "multi-pair Ethernet cable" is herein used to refer to a 2-pair Ethernet cable, a 4-pair Ethernet, and/or other multi-pair configurations of Ethernet cables.

In an example case, data from the first Ethernet device 502 is transmitted to the media converter 504 over the SPE data cable 503, the media converter 504 transforms the data into a format suitable for 2-pair or 4-pair Ethernet (or both), and the media converter transmits the transformed data over the 2-pair or the 4-pair Ethernet data cable 505 (also herein called a multi-pair Ethernet cable) to the second Ethernet device 506.

In another example case, data from the second Ethernet device 506 is transmitted to the media converter 504 over the 2-pair or 4-pair Ethernet data cable 505, the media converter 504 transforms the data into a format suitable for SPE, and the media converter transmits the transformed data over the SPE data cable 503 to the first Ethernet device 502.

The first Ethernet device 502 includes internal electronics 508, which are powered by a first external power supply 510. The media converter 504 includes a subsystem of internal electronics 512, which interfaces between an SPE connector a multi-pair Ethernet connector (e.g., a RJ45 connector). The subsystem 512 is powered by a second external power supply 514. The second Ethernet device 506 includes internal electronics 516, which are powered by a third external power supply 518.

In some cases, the media converter 504 and the second power supply 514 are located approximately 1 kilometer away from the first Ethernet device 502, and the second Ethernet device 506 and the third power supply 518 is located approximately 100 meters away from the media converter 504. This allows the second Ethernet device 506 to be located very far away from the first Ethernet device 502, while maintaining fast data transmission.

More broadly, the first Ethernet device 502 is configured to be powered by the first external power supply 510. The media converter 504 is coupled to the first Ethernet device 502 through the SPE cable 503. The media converter 504 is configured to be powered by the second external power supply 514. The second Ethernet device 506 is coupled to the media converter 504 through the multi-pair Ethernet cable 505, and the second Ethernet device 506 is configured to be powered by the third external power supply 518.

Figure 5B:
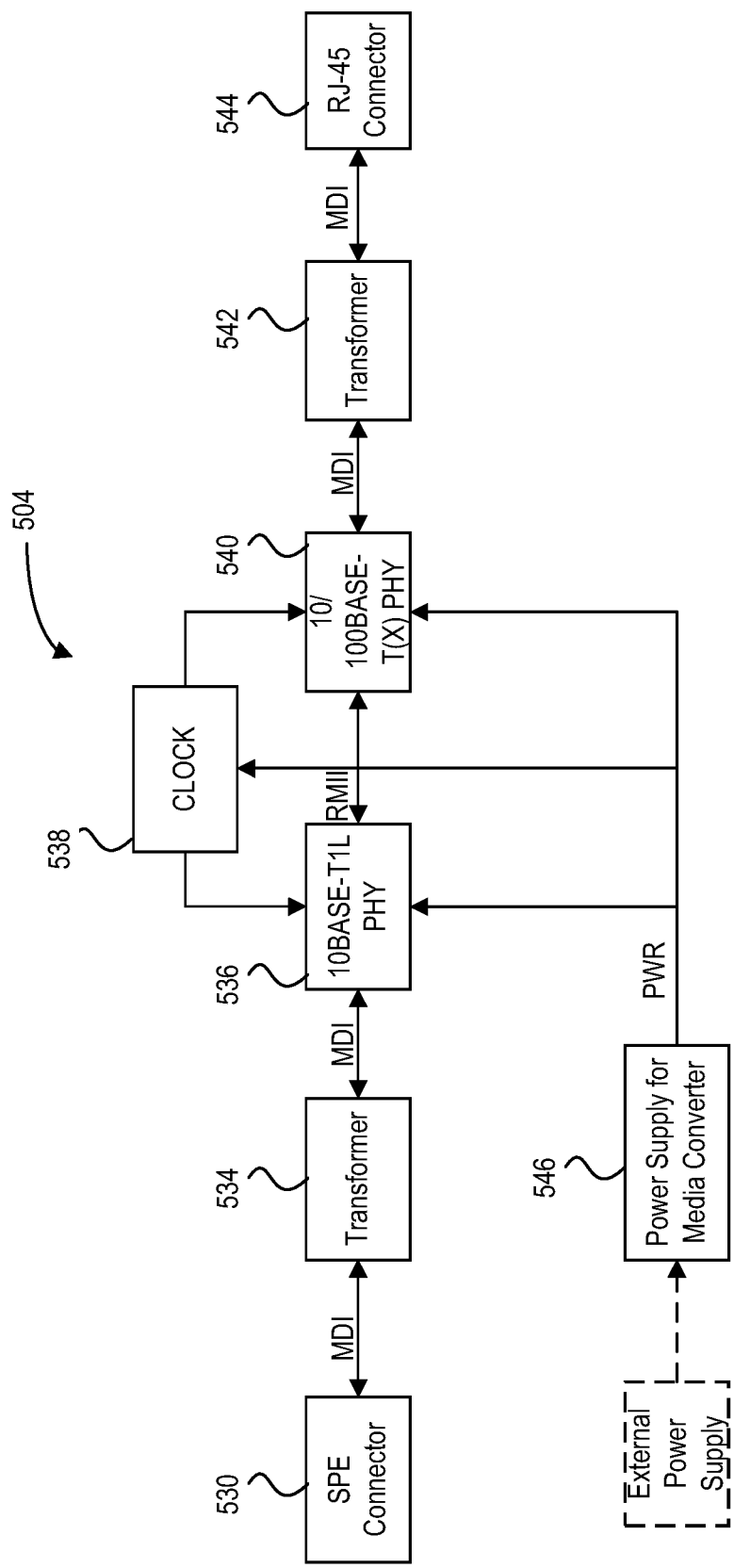
FIG. 5B is a block diagram of an example implementation of the media converter in FIG. 5A according in accordance with some embodiments.

Referring to FIG. 5B, an example embodiment of the media converter 504 is provided. The internal electronics 512 are also called an electronics subsystem, example components of which are shown in FIG. 5B. It includes an SPE connector 530 that is connected, via a Media Dependent Interface (MDI), to a first transformer 534. The first transformer 534 is connected, via a MDI, to a first PHY device 536. In an example aspect, the first PHY device 536 is a 10BASE-T1L PHY. In another example aspect, the first PHY device 536 is suited for SPE. More generally, a PHY device is a chip or an electronic circuit that implements the physical layer in the Open Systems Interconnection (OSI) model of computer networking. For Ethernet technology, a PHY device is also called an "Ethernet PHY", a "PHY chip", or just "PHY".

The first PHY device 536 is connected, via a Reduced Media Independent Interface (RMII), to a second PHY device 540. In an example aspect, the second PHY device 540 is a 10/100BASE-T (X) PHY.

A clock 538 is connected to both the first PHY device 536 and the second PHY device 540. The clock 538 drives both PHY devices 536 and 540 with a synchronized time signal.

The second PHY device 540 is connected, via a MDI, to a second transformer 542. The second transformer 542 is connected, via a MDI, to a multi-pair Ethernet connector 544. In an example aspect, the multi-pair Ethernet connector 544 is a RJ-45 connector.

The media converter 504 also includes a power supply 546, which is configured to receive power from an external power source. The power supply 546 transmits power 546 to the PHY devices 536 and 540, and to the clock 538. In an example aspect, the clock is configured to operate at 50 MHz. However, the clock speed can vary depending on the PHY devices.

More broadly, the media converter 504 includes the SPE connector 530 coupled to the first transformer 534; the first PHY device 536 coupled to the first transformer 534; the second PHY device 540 coupled to the first PHY device 536; the second transformer 542 coupled to the second PHY device 540; the multi-pair Ethernet connector 544 coupled to the second transformer 542; the clock 538 coupled to the first PHY device 536 and the second PHY device 540; and the power supply 546 coupled to the first PHY device 536, the second PHY device 540 and the clock 538.

Figure 6A:
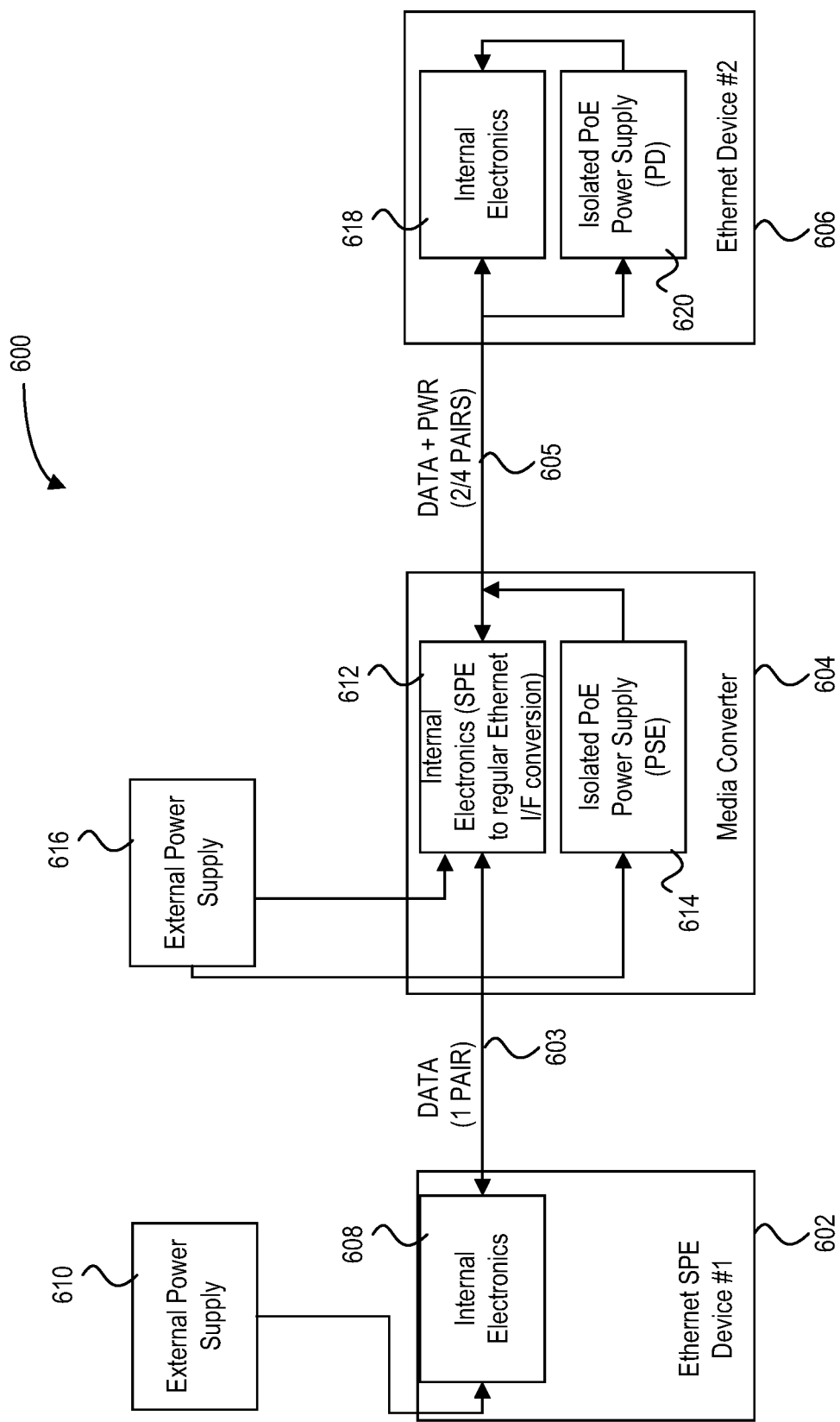
FIG. 6A is a block diagram of two Ethernet devices and a media converter interfacing, and the media converter is powered by an external power supply, in accordance with some embodiments.

Referring to FIG. 6A, an example embodiment of a system 600 is shown that includes a first Ethernet device 602, a media converter 604, and a second Ethernet device 606. The second Ethernet device 606 is an endpoint Ethernet device that receives and consumes power provided through a multi-pair Ethernet cable 605. The multi-pair cable 605 includes 2-pairs or 4-pairs of wires, and is configured to transmits data and power. In some cases, the second Ethernet device 606 receives power over the multi-pair Ethernet cable 605 and sends data over the multi-pair Ethernet cable 605. In some other cases, the second Ethernet device 606 receives power over the multi-pair Ethernet cable 605 and receives data over the multi-pair Ethernet cable 605. In some other cases, the second Ethernet device 606 receives power over the multi-pair Ethernet cable 605 as well as sends and receives data over the multi-pair Ethernet cable 605.

The data can be exchanged between the first Ethernet device 602 and the second Ethernet device 606 by using the media converter 604.

The first Ethernet device 602 includes internal electronics 608 that is configured to be powered by a first external power supply 610. A SPE cable 603 transmits data between the first Ethernet device 602 and the media converter 604. In a more specific example aspect, data from the internal electronics 608 is transmitted over the SPE cable 603 to internal electronics 612 of the media converter 604.

The media converter 604 also includes an internal power supply 614 that is configured to receive power from a second external power supply 616. The internal electronics 612 of the media converter 604 are also configured to receive power from the second external power supply 616. The internal electronics 612 is an interface for the data between the SPE data format and the conventional Ethernet data format (for 2-pair Ethernet or 4-pair Ethernet).

The internal power supply 614 supplies power to the multi-pair Ethernet cable 605, also called a multi-pair Ethernet cable. The internal power supply 614 is also called Power Source Equipment (PSE). In an example aspect, the internal power supply 614 is an isolated PoE power supply. In a further example aspect, the isolated PoE power supply is a type of galvanically isolated PoE power supply, or in other words is a PoE power supply with galvanic isolation.

The second Ethernet device 606 includes internal electronics 618 for transmitting or receiving data, or both. The second Ethernet device 606 also includes an internal power supply 620, which receives the power from the multi-pair Ethernet cable 605, and uses the received power to supply power to the internal electronics 618. The internal power supply 620 is also an isolated PoE power supply, also called a Powered Device (PD).

More broadly, the first Ethernet device 602 is configured to be powered by the first external power supply 610. The media converter 604 is coupled to the first Ethernet device 602 through a SPE cable 603. The media converter 604 is configured to be powered by the second external power supply 616. The second Ethernet device 606 is coupled to the media converter 604 through the multi-pair Ethernet cable 605 that is configured to transmit data and power. The media converter 604 comprises the isolated power supply 614 that is configured to transmit the power over the multi-pair Ethernet cable 605. The second Ethernet device 606 comprises the isolated power supply 620 that is configured receive the power transmitted over the multi-pair Ethernet cable 605.

Figure 6B:
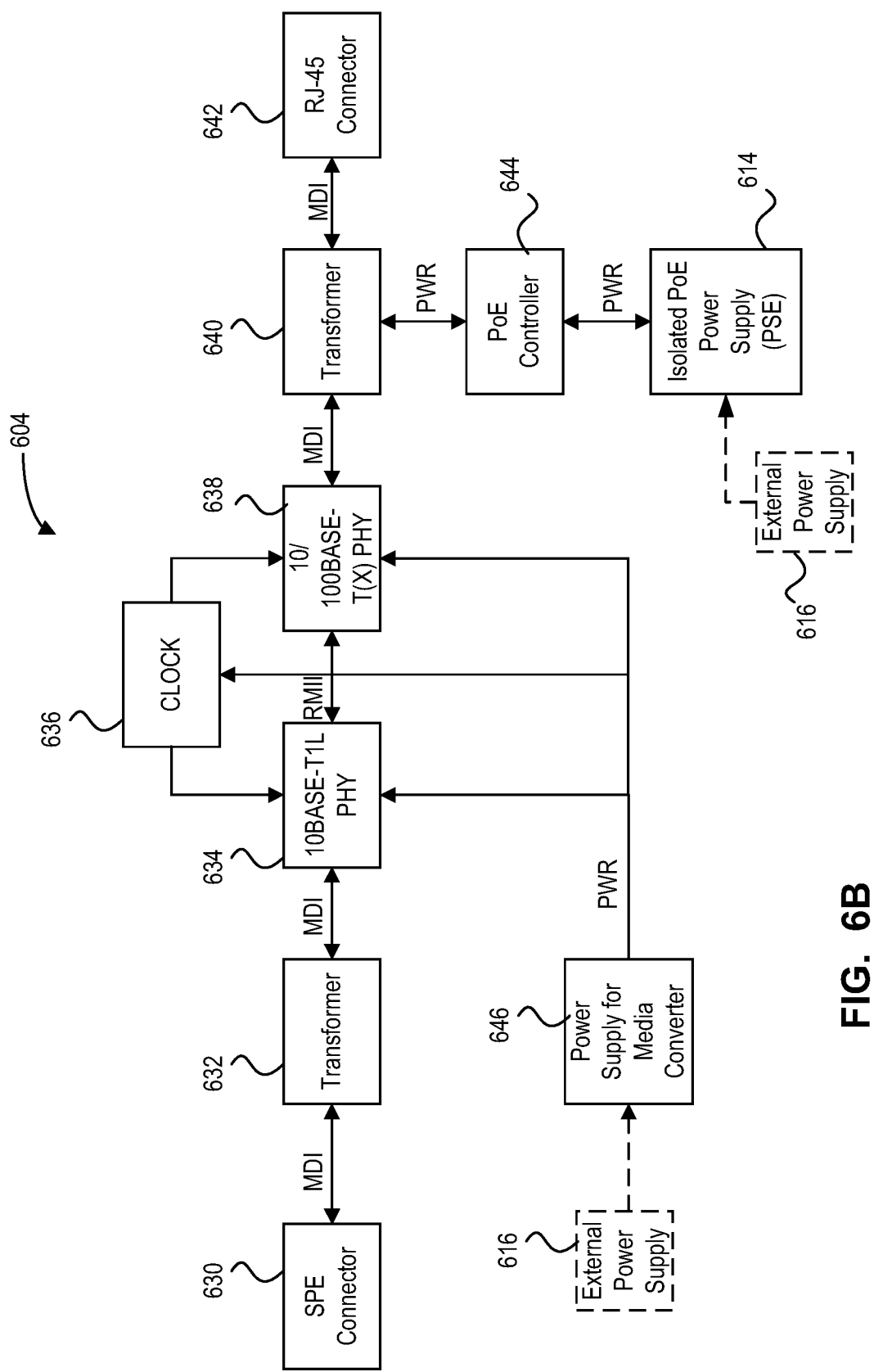
FIG. 6B is a block diagram of an example implementation of the media converter in FIG. 6A according in accordance with some embodiments.

Referring to FIG. 6B, an example embodiment of the media converter 604 is shown. The internal electronics 612 are also called an electronics subsystem, example components of which are shown in FIG. 6B. It includes a SPE connector 630, a first transformer 632, a first PHY device 634, a clock 636, a second PHY device 638, a second transformer 640, a multi-pair Ethernet connector 642, a PoE controller 644, a power supply 616, and an isolated power supply 614. PoE controllers are used to control the delivery of DC power and data from power source equipment (PSE) to powered devices (PD) over multi-pair Ethernet cables. In a further example aspect, PoE controllers perform PD detection and classification, power distribution, and fault detection.

The SPE connector 630 is connected, via a MDI, to the first transformer 632. The first transformer 632 is connected, via a MDI, to the first PHY device 634. In an example aspect, the first PHY device 634 is a 10BASE-T1L PHY. The first PHY device 634 is connected, via a RMII, to the second PHY device 638. In an example aspect, the second PHY device 638 is a 10/100BASE-T (X) PHY. The clock 636 is coupled to both PHY devices 634 and 638 and transmits a clock signal to both. The second PHY device 638 is connected, via a MDI, to a second transformer 640. The second transformer 640 is connected, via a MDI, to the multi-pair Ethernet connector 642. In an example aspect, the connector 642 is a RJ-45 connector. Other types of connectors suitable for multi-pair Ethernet cables can be used.

The second transformer 640 receives is connected to the PoE controller 644 and, in particular, receives power from the PoE controller 644. The PoE controller 644 is connected to the isolated power supply 614 and, in particular, receives power from the isolated power supply 614. The isolated power supply 614 is configured for PoE.

In other words, power from an external power supply 616 is transmitted to the isolated power supply 614, and the power is then transmitted via the PoE controller 644 to the second transformer 640, and outputted via the multi-pair Ethernet connector 642 for transmission over a multi-pair Ethernet cable.

Power from the external power supply 616 also powers another power supply 646, which in turn supplies power to the PHY devices 634 and 638, and to the clock 636.

More broadly, the media converter 604 includes: the SPE connector 630 coupled to the first transformer 632; the first PHY device 634 coupled to the first transformer 632; the second PHY device 638 coupled to the first PHY device 634; the second transformer 640 coupled to the second PHY device 638; the multi-pair Ethernet connector 642 coupled to the second transformer 640; the clock 636 coupled to the first PHY device 634 and the second PHY device 638; the power supply 646 coupled to the first PHY device 634, the second PHY device 638 and the clock 636; the PoE controller 644 coupled to the second transformer 640; and the isolated power supply 614 coupled to the PoE controller 644.

Figure 7A:
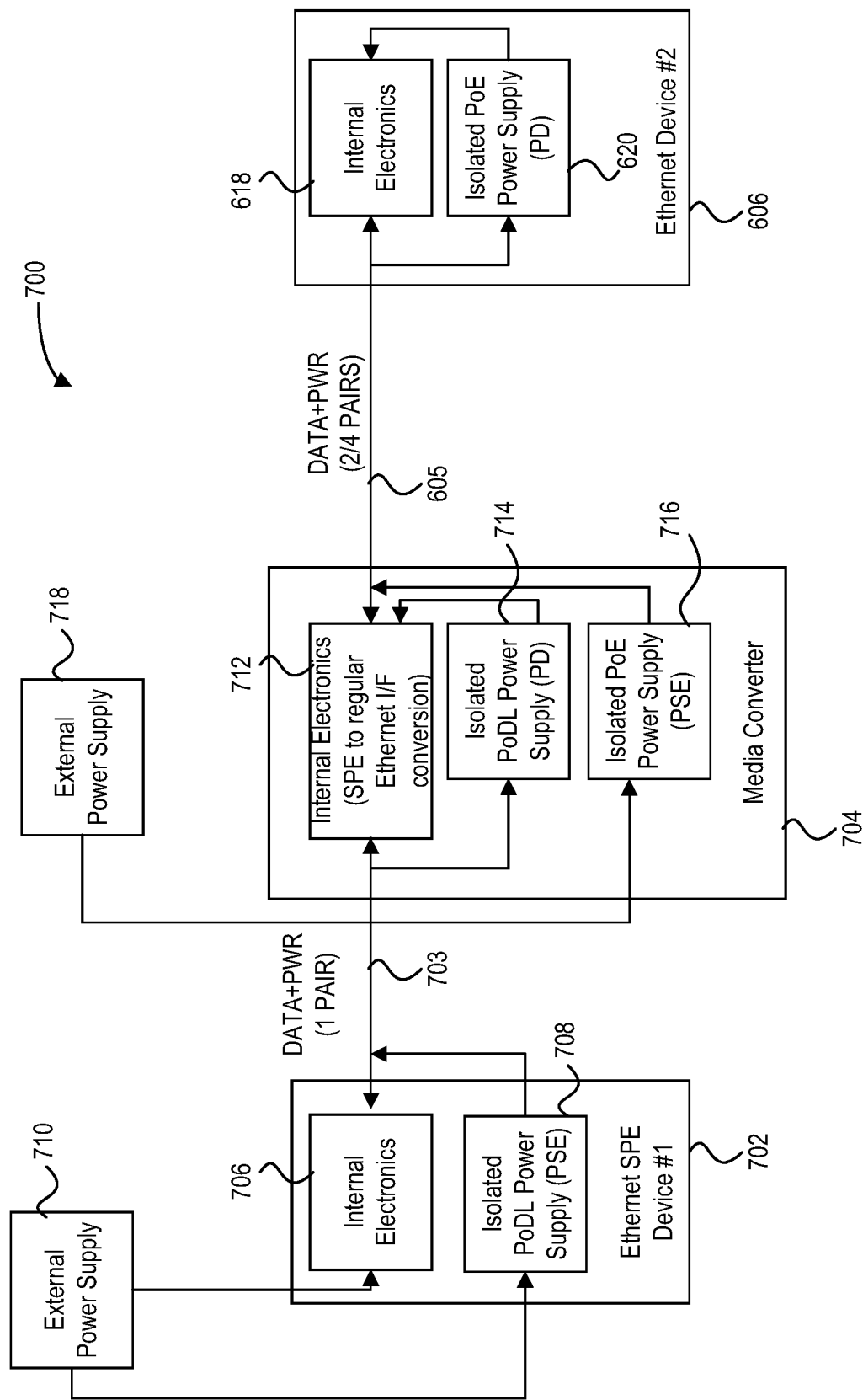
FIG. 7A is a block diagram of two Ethernet devices and a media converter interfacing, and the media converter is powered by an external power supply, in accordance with some embodiments.

Referring to FIG. 7A, an example embodiment of a system 700 is provided that includes a first Ethernet device 702, a media converter 704, and a second Ethernet device 606. A SPE cable 703, which can transmit data and power, connects the first Ethernet device 702 to the media converter 704. A multi-pair Ethernet cable 605 connects the media converter 704 to the second Ethernet device 606.

The media converter 704 is configured to receive power from the SPE cable 703 to operate its internal electronics 712, which is an electronics subsystem between a SPE connector and a RJ-45 connector or the like. The media converter 704 is also configured to receive power from an external power source (e.g., a second external power supply 718) and transmit this power to the second Ethernet device 606 over the multi-pair Ethernet cable 605.

In the system 700, the first Ethernet device 702 is configured for SPE and includes internal electronics 706 and a first power supply 708. In an example aspect, the first power supply 708 is an isolated PoDL power supply, or PSE. A first external power supply 710 supplies power to the internal electronics 706 and the first power supply 708. The first power supply 708 supplies a first power over the SPE cable 703.

The media converter 704 includes the internal electronics 712, a second power supply 714 and a third power supply 716. In an example aspect, the second power supply 714 is an isolated PoDL power supply, or PD, and the third power supply 716 is an isolated PoE power supply, or PSE. The first power that is transmitted over the SPE cable 703 is received by the second power supply 714, which uses the first power to power the internal electronics 712. The third power supply 716, which is powered by the second external power supply 718, generates a second power. The second power is transmitted over the multi-pair Ethernet cable 605 to the second Ethernet device 606.

More broadly, the first Ethernet device 702 comprises the first power supply 708. The media converter 704 is coupled to the first Ethernet device 702 through a SPE cable 703 that is configured to transmit a data and a first power, and the media converter 704 further comprises the second power supply 714 and a third power supply 716. The second Ethernet device 606 is coupled to the media converter 704 through a multi-pair Ethernet cable 605 that is configured to transmit the data and the second power. The second Ethernet device comprises a fourth power supply 620. The first power supply 708 is configured to be powered by the first external power supply 710 and is also configured to transmit the first power over the SPE cable 703. The second power supply 714 is configured to receive the first power from the SPE cable 703 and to power the media converter 704. The third power supply 716 is configured to be powered by the second external power supply 718 and is configured to transmit the second power over the multi-pair Ethernet cable 605. The fourth power supply 620 is configured to receive the second power over the multi-pair Ethernet cable 605.

Figure 7B:
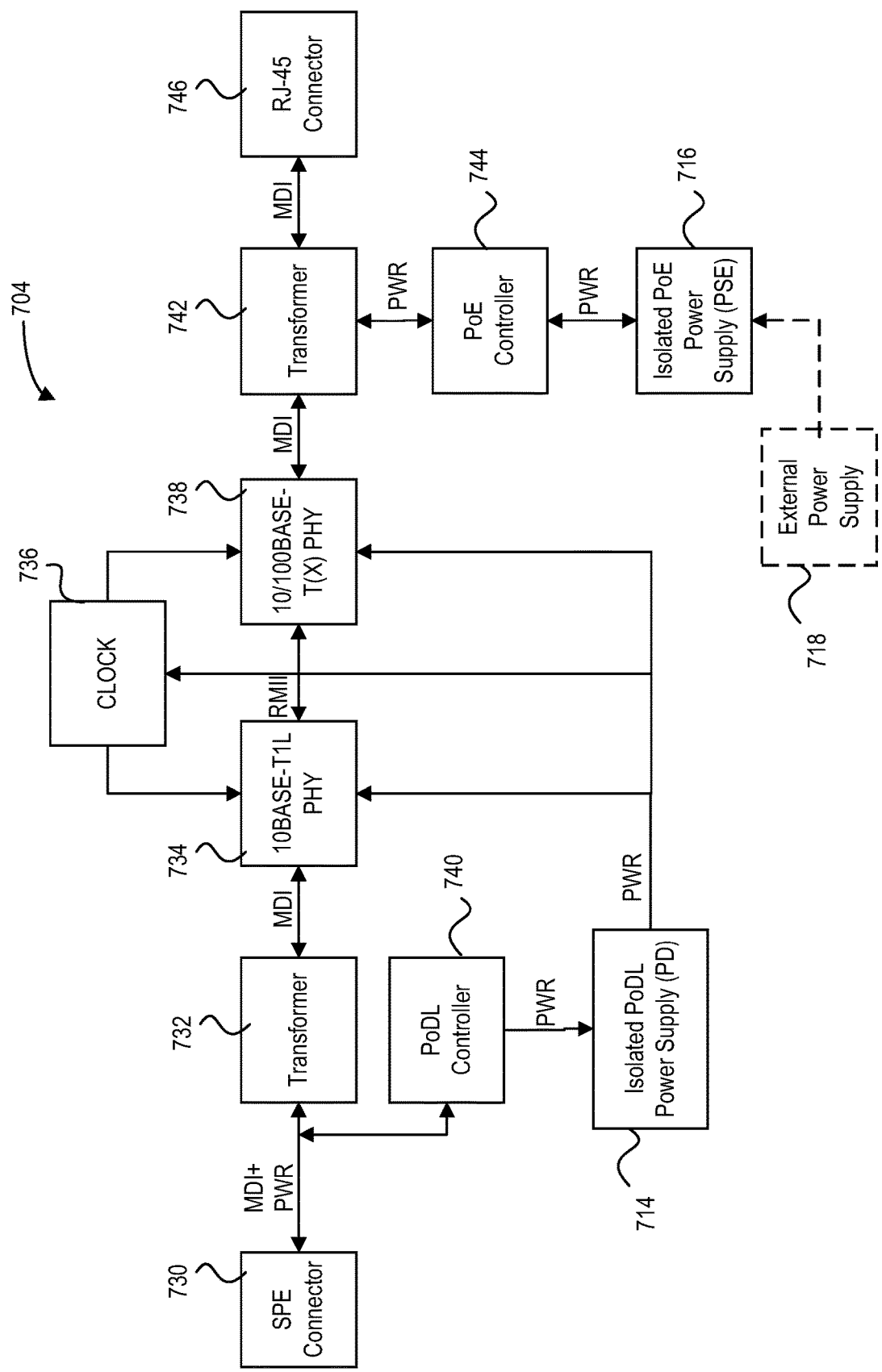
FIG. 7B is a block diagram of an example implementation of the media converter in FIG. 7A according in accordance with some embodiments.

Referring to FIG. 7B, an example embodiment of the media converter 704 is shown. The internal electronics 712 are also called an electronics subsystem, example components of which are shown in FIG. 7B. It includes a SPE connector 730, a first transformer 732, a first PHY device 734, a clock 736, a second PHY device 738, a second transformer 742, a multi-pair Ethernet connector 746, a PoE controller 744, an isolated PoDL power supply 714, and an isolated PoE power supply 716. The isolated PoDL power supply 714 powers the first PHY device 734, the second PHY device 738 and the clock 736. The isolated PoE power supply 716 generates power that is to be transmitted through the multi-pair Ethernet connector 746.

The configuration of the components in FIG. 7B have some similarities to the configuration of the components in FIG. 6B. For example, the first PHY device 734 is a 10BASE-T1L PHY and the second PHY device 738 is a 10/100BASE-T (X) PHY.

In FIG. 7B, however, the SPE connector 730 is connected to the first transformer 732 via a MDI and power interface. Power from the SPE 730, also called the first power in FIG. 7A, is transmitted to the PoDL controller 740, and the power is then transmitted to the isolated power supply 714.

PoDL controllers are used to control the delivery of DC power and data from power source equipment to powered devices over SPE cables. In a further example aspect, PoDL controllers perform PD detection and classification, power distribution, and fault detection.

In an example aspect, the power outputted from the PoDL controller 740 and inputted into the isolated power supply 714 has a higher voltage than the power outputted from the isolated power supply 714 into the PHY devices and the clock. In an example embodiment, the power outputted by the PoDL controller has a voltage range between 14 and 30 VDC, or a voltage range between 35 and 58 VDC. The power outputted by the isolated power supply 714 has voltage or approximately 3.3 V. It will be appreciated that the voltage values can vary.

The third power supply 716, which in some cases is an isolated power supply for PoE (or PSE), is powered by an external power supply 718. The third power supply 716 generates a second power, which is transmitted to the PoE controller 744, to the second transformer 742, and to the multi-pair Ethernet connector 746. In this example, the second power may be transmitted over the multi-pair Ethernet cable that is connected to the connector 746.

In an example aspect, the power outputted by the isolated power supply 716 a voltage range between 44 and 57 VDC.

More broadly, the media converter 704 comprises: the SPE connector 730 coupled to the first transformer 732; the first PHY device 734 coupled to the first transformer 732; the second PHY device 738 coupled to the first PHY device 734; the second transformer 742 coupled to the second PHY device 738; the multi-pair Ethernet connector 746 coupled to the second transformer 742; the clock 736 coupled to the first PHY device 734 and the second PHY device 738; the PoDL controller 740 coupled to the SPE connector 730; the power supply 714 coupled to the PoDL controller 740 and the power supply 714 further coupled to the first PHY device 734, the second PHY device 738 and the clock 736; a PoE controller 744 coupled to the second transformer 742; and another power supply 716 coupled to the PoE controller 744.

Figure 8A:
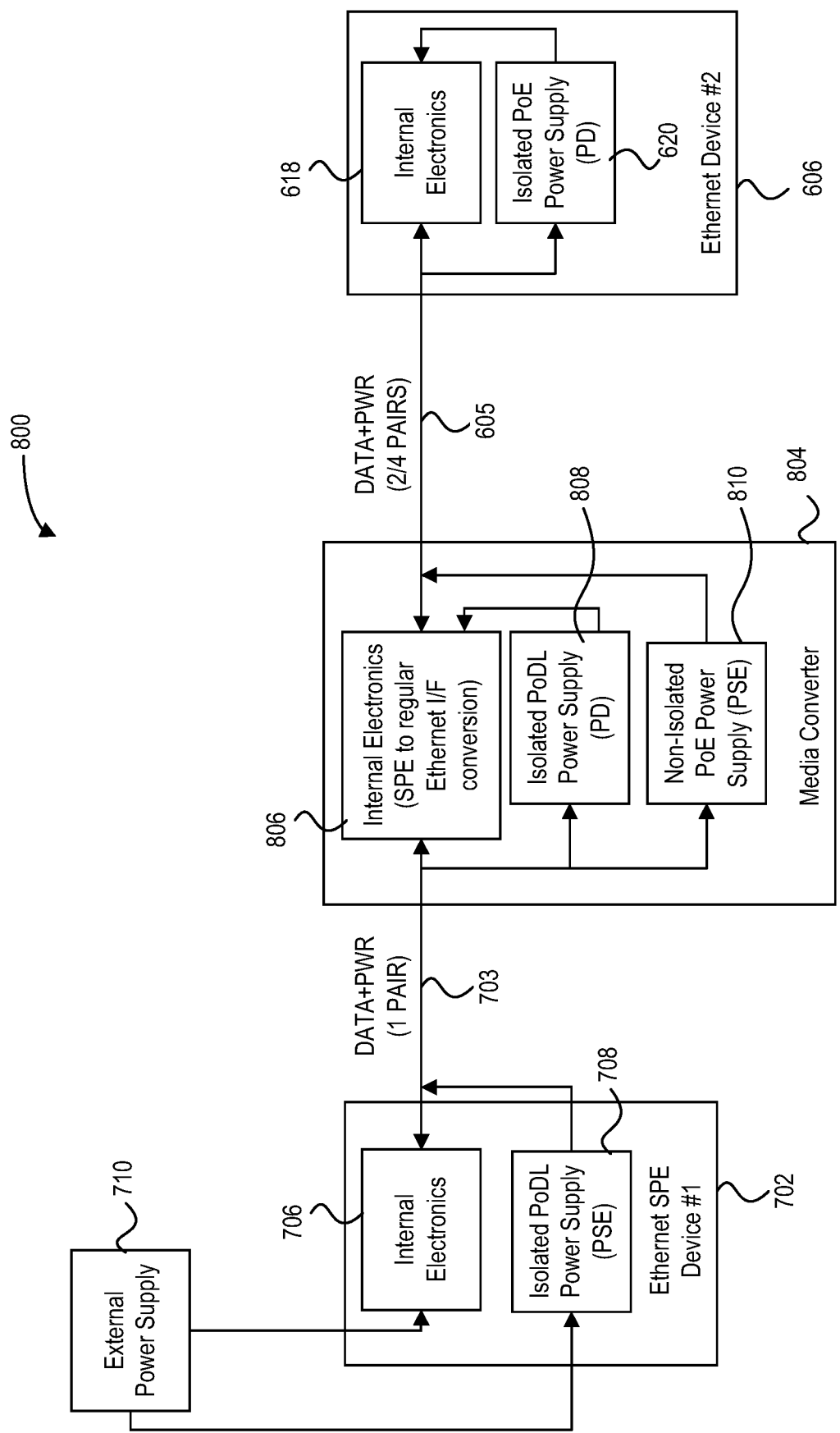
FIG. 8A is a block diagram of two Ethernet devices and a media converter interfacing, and the media converter is powered by an external power supply, in accordance with some embodiments.

Referring to FIG. 8A, an example embodiment of a system 800 shows a first Ethernet device 702, a media converter 804, and a second Ethernet device 606. A SPE cable 703 connects the first Ethernet device 702 and the media converter 804. A multi-pair Ethernet cable 605 connects the media converter 804 and the second Ethernet device 606.

In this example embodiment, the first power supply 710 powers the first Ethernet device. Power from the first Ethernet device is transmitted over the SPE cable 703 to power the media converter 804. That same power is also transmitted to from the media converter 804 to the second Ethernet device 606. In other words, the second Ethernet device 606 is being powered by the first external power supply 710.

The media converter 804 includes internal electronics 806, an isolated PoDL power supply 808 (also called a PD), and a non-isolated PoE power supply 810 (also called a PSE). Data from the SPE cable 703 is transmitted to the internal electronics 806, and data from the internal electronics 806 is transferred to the multi-pair Ethernet cable 605. The data can also flow the other direction, from the multi-pair Ethernet cable 605 to the internal electronics 806, and from the internal electronics 806 to the SPE cable 703. In other words, the internal electronics 806 is a subsystem that is an media interface between an SPE connector and a multi-pair Ethernet connector.

Power from the SPE cable 703 is supplied to the isolated power supply 808 and the non-isolated power supply 810. The isolated power supply 808 provides power the internal electronics 806. The non-isolated power supply 810 provides power to the multi-pair Ethernet cable 605, which supplies power to the second Ethernet device 606.

More broadly, the first Ethernet device 702 comprises a first power supply 708. The media converter 804 is coupled to the first Ethernet device 702 through a SPE cable 703 that is configured to transmit a data and a first power, and the media converter further comprises a second power supply 808 and a third power supply 810. A second Ethernet device 606 is coupled to the media converter 804 through a multi-pair Ethernet cable 605 that is configured to transmit the data and a second power, the second Ethernet device comprising a fourth power supply 620. The first power supply 708 is configured to be powered by an external power supply 710 and is configured to transmit the first power over the SPE cable 703. The second power supply 808 is configured to receive the first power and is further configured to power the media converter 804. The third power supply 810 is configured to receive the first power, generate the second power, and transmit the second power to the multi-pair Ethernet cable 605. The fourth power supply 606 is configured to receive the second power from the multi-pair Ethernet cable 605.

Figure 8B:
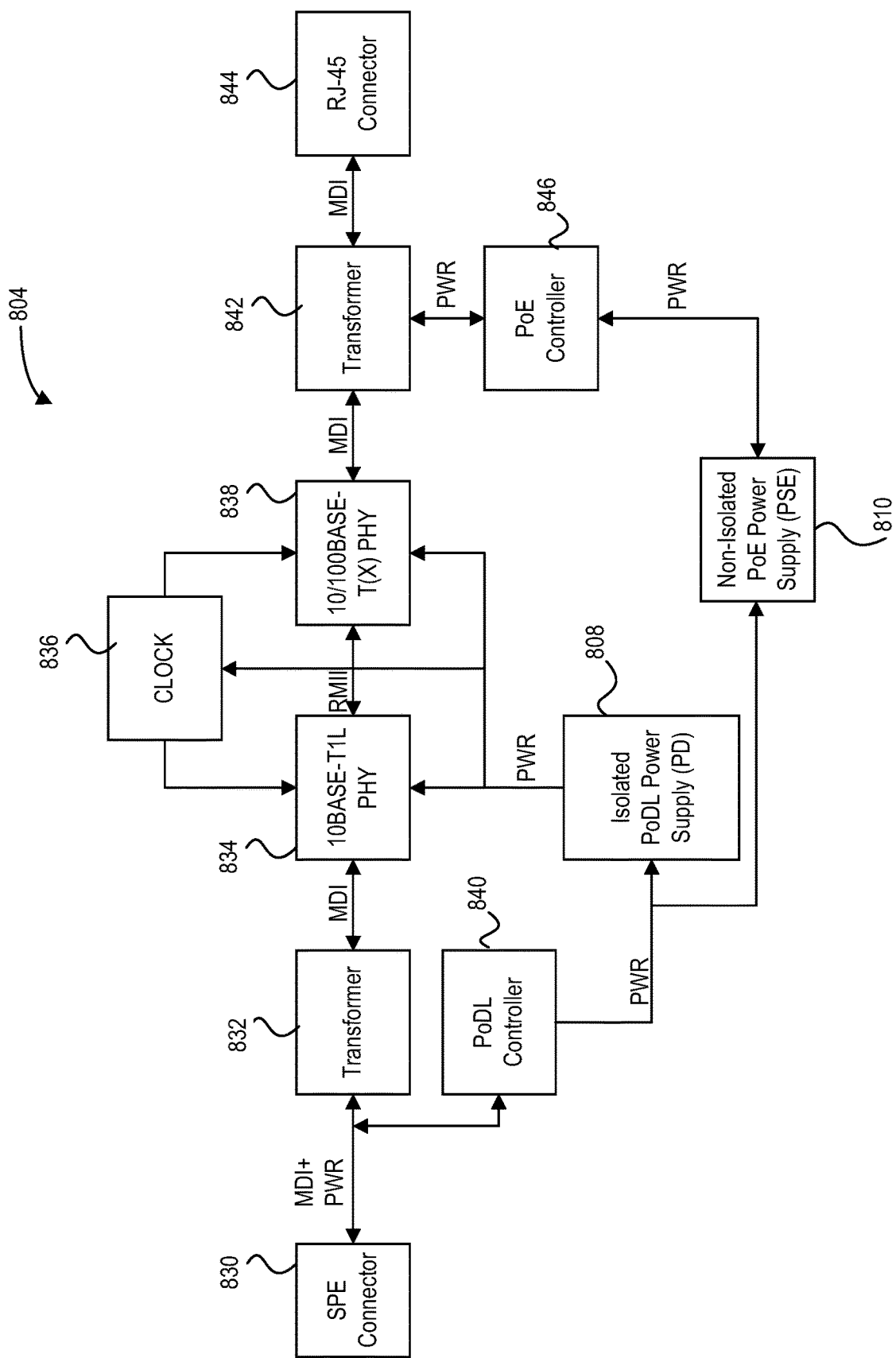
FIG. 8B is a block diagram of an example implementation of the media converter in FIG. 8A according in accordance with some embodiments.

Referring to FIG. 8B, an example embodiment of the media converter 804 is shown. The internal electronics 806 are also called an electronics subsystem, example components of which are shown in FIG. 8B. It includes a SPE connector 830, a first transformer 832, a first PHY device 834, a clock 836, a second PHY device 838, a second transformer 842, a multi-pair Ethernet connector 844, a PoE controller 846, an isolated power supply 808 for powering the PHY devices 834, 838 and the clock 836, and a non-isolated power supply 810 for PoE.

The configuration of the components in FIG. 8B have some similarities to the configuration of the components in FIG. 7B. For example, the first PHY device 834 is a 10BASE-T1L PHY and the second PHY device 838 is a 10/100BASE-T (X) PHY.

However, in FIG. 8B, the SPE connector 830 is connected to the first transformer 832 via a MDI and power interface. Power from the SPE connector 830 is supplied to the PoDL controller 840. Power from the PoDL controller 840 is supplied to the isolated power supply 808 and to the non-isolated power supply for PoE 810. The non-isolated power supply for PoE 810 supplies power to the PoE controller 846, which in turn supplies power to the second transformer 842 for power transmission via the multi-pair Ethernet connector 844.

More broadly, in some cases, the media converter 804 comprises: the SPE connector 830 coupled to the first transformer 832; the first PHY device 834 coupled to the first transformer 832; the second PHY device 838 coupled to the first PHY device 834; the second transformer 842 coupled to the second PHY device 838; the multi-pair Ethernet connector 844 coupled to the second transformer 842; the clock 836 coupled to the first PHY device 834 and the second PHY device 838; the PoDL controller 840 coupled to the SPE connector 830; the isolated power supply 808 coupled to the PoDL controller 840 and the isolated power supply 808 further coupled to the first PHY device 834, the second PHY device 838 and the clock 836; the PoE controller 846 coupled to the second transformer 842; and the non-isolated power supply 810 coupled to the PoE controller 846 and to the PoDL controller 840.

Both Ethernet and SPE, and as a result PoE and PoDL require galvanic isolation for a number of reasons, including signal integrity, compliance to electromagnetic compatibility standards, safety, etc. While the embodiments described herein use a galvanically isolated power supply, the named inventors of this patent application have further recognized that power conversion between PoDL and PoE does not require isolation from each other if the power supplied, say for example power from the PoDL side, is already isolated. The named inventors of this patent application have further recognized that each PoE and PoDL technologies have voltage ranges that different while mostly overlapping.

In some cases related to PoDL-to-PoE conversion, the PoE PSE output power voltage is 44 to 57 V for IEEE 802.3af, and 50 to 57 V for IEEE 802.3at or IEEE 802.3bt Type 3. However, PoDL input power range is 35 to 58 V.

In an example embodiment, a non-isolated power supply for PoE is provided. In an example aspect of the non-isolated power supply, in a first mode, when range of input power is in the range of output power, then there is no power conversion and a bypass connection is turned on. In an example aspect of the non-isolated power supply, in a second mode, when input power drops below output power range, then the power converter closes the bypass and works as a boost converter delivering nominal output voltage at a selected value in the output range.

Figure 8C:
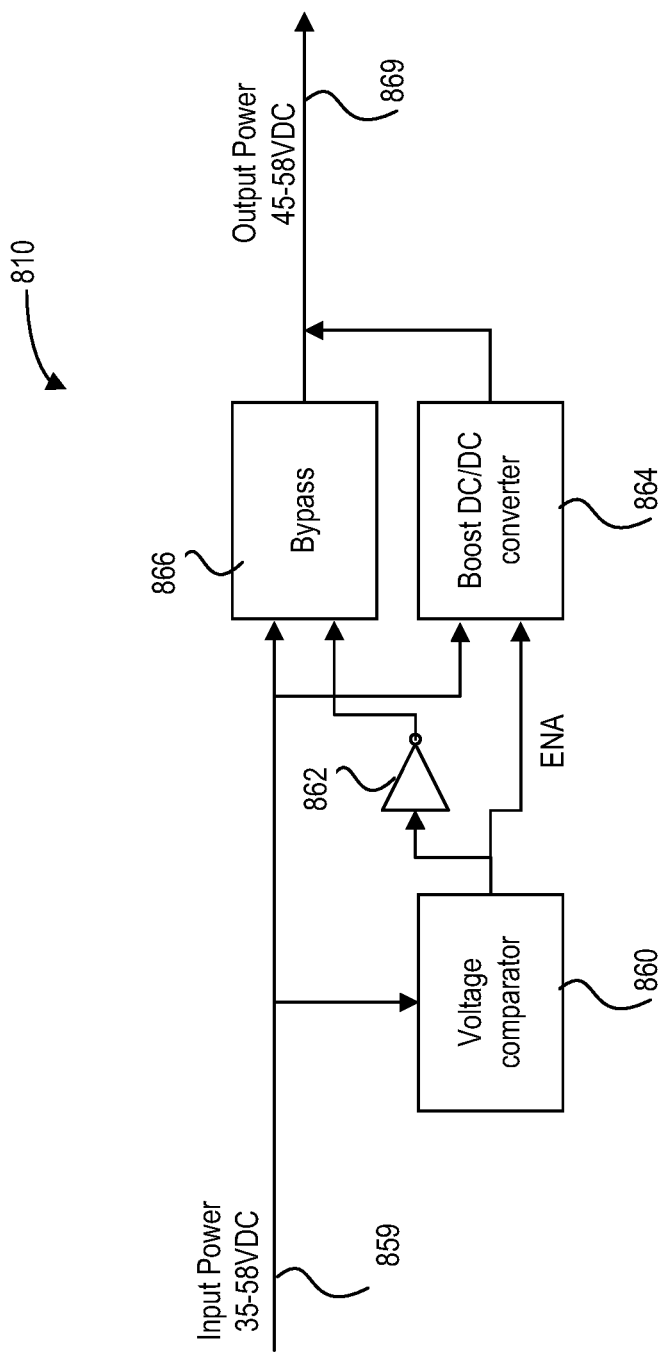
FIG. 8C is a block diagram of an example implementation of a non-isolated power supply in FIG. 8B according in accordance with some embodiments.

Referring to FIG. 8C an example embodiment of the non-isolated power supply for PoE is provided. It includes an input electrical line 859 and an output electrical line 869. The input power line coupled to a bypass device 866, a boost converter 864 for direct current, and a voltage comparator 860. The voltage comparator is coupled to a logic inverter 862 and the boost converter 864. The logic inverter 862 is coupled to the bypass device 866. The bypass device 866 and the boost converter 864 are coupled to the output power line 869.

In an example aspect, the input power has voltage range of 35 to 58 VDC and the output power has a voltage range of 45 to 58 VDC.

The voltage comparator 860 compares the voltage at the input power line 859 against a threshold. For example, the threshold is a predetermined value that is the lower nominal value of the desired output voltage at the output power line 869. For example, if the desired range at the output power line is 45 to 58 VDC, the threshold for the comparator 860 is 45 V. In an example aspect, the voltage comparator 860 outputs a logic 1 or a high signal when the input voltage is below the threshold, and the voltage comparator outputs a logic 0 or a low signal when the input voltage is above the threshold.

Compared to isolated power supplies, the example embodiment of the non-isolated power supply 810 has less components and less complexity, which results in less power loss or less power waste. In other words, the non-isolated power supply 810 is more energy efficient.

More particularly, there are some cases when power conversion is required from PoDL to PoE. In these cases, the power conversion does not require isolation and is more power efficient.

In some other cases when no power conversion is required from PoDL to PoE, there is negligible power loss as power can transfer through the bypass device.

Below are additional example embodiments.

In a broad example aspect, an apparatus is provided, comprising: a SPE connector coupled to a first transformer; a first PHY device coupled to the first transformer; a second PHY device coupled to the first PHY device; a second transformer coupled to the second PHY device; a multi-pair Ethernet connector coupled to the second transformer; a clock coupled to the first PHY device and the second PHY device; and a power supply coupled to the first PHY device, the second PHY device and the clock.

In another broad example aspect, a system is provided, comprising: a first Ethernet device, which is configured to be powered by a first external power supply; a media converter coupled to the first Ethernet device through a SPE cable, the media converter configured to be powered by a second external power supply; and a second Ethernet device coupled to the media converter through a multi-pair Ethernet cable, the second Ethernet device configured to be powered by a third external power supply.

In another broad example aspect, an apparatus is provided, comprising: a SPE connector coupled to a first transformer; a first PHY device coupled to the first transformer; a second PHY device coupled to the first PHY device; a second transformer coupled to the second PHY device; a multi-pair Ethernet connector coupled to the second transformer; a clock coupled to the first PHY device and the second PHY device; a power supply coupled to the first PHY device, the second PHY device and the clock; a PoE controller coupled to the second transformer; and an isolated power supply coupled to the PoE controller.

In another broad example aspect, a system is provided, comprising: a first Ethernet device, which is configured to be powered by a first external power supply; a media converter coupled to the first Ethernet device through a SPE cable, the media converter configured to be powered by a second external power supply; a second Ethernet device coupled to the media converter through a multi-pair Ethernet cable that is configured to transmit data and power; and wherein the media converter comprises an isolated power supply configured to transmit the power over the multi-pair Ethernet cable and the second Ethernet device comprises an isolated power supply configured to be receive the power transmitted from the multi-pair Ethernet cable.

In another broad example aspect, an apparatus is provided, comprising: a SPE connector coupled to a first transformer; a first PHY device coupled to the first transformer; a second PHY device coupled to the first PHY device; a second transformer coupled to the second PHY device; a multi-pair Ethernet connector coupled to the second transformer; a clock coupled to the first PHY device and the second PHY device; a PoDL controller coupled to the SPE connector; a first power supply coupled to the PoDL controller and the first power supply further coupled to the first PHY device, the second PHY device and the clock; a PoE controller coupled to the second transformer; and a second power supply coupled to the PoE controller.

In another broad example aspect, a system is provided, comprising: a first Ethernet device comprising a first power supply; a media converter coupled to the first Ethernet device through a SPE cable that is configured to transmit a data and a first power, and the media converter further comprises a second power supply and a third power supply; a second Ethernet device coupled to the media converter through a multi-pair Ethernet cable that is configured to transmit the data and a second power, the second Ethernet device comprising a fourth power supply; wherein the first power supply is configured to be powered by a first external power supply and is configured to transmit the first power over the SPE cable; wherein the second power supply is configured to receive the first power from the SPE cable and to power the media converter; wherein the third power supply is configured to be powered by a second external power supply and is configured to transmit the second power to the multi-pair Ethernet cable; and wherein the fourth power supply is configured to receive the second power from the multi-pair Ethernet cable.

In another broad example aspect, an apparatus is provided, comprising: a SPE connector coupled to a first transformer; a first PHY device coupled to the first transformer; a second PHY device coupled to the first PHY device; a second transformer coupled to the second PHY device; a multi-pair Ethernet connector coupled to the second transformer; a clock coupled to the first PHY device and the second PHY device; PoDL controller coupled to the SPE connector; an isolated power supply coupled to the PoDL controller and the first power supply further coupled to the first PHY device, the second PHY device and the clock; a PoE controller coupled to the second transformer; and a non-isolated power supply coupled to the PoE controller and to the PoDL controller.

In another broad example aspect, a system is provided, comprising: a first Ethernet device comprising a first power supply; a media converter coupled to the first Ethernet device through a SPE cable that is configured to transmit a data and a first power, and the media converter further comprises a second power supply and a third power supply; a second Ethernet device coupled to the media converter through a multi-pair Ethernet cable that is configured to transmit the data and a second power, the second Ethernet device comprising a fourth power supply; wherein the first power supply is configured to be powered by an external power supply and is configured to transmit the first power over the SPE cable; wherein the second power supply is configured to receive the first power and is further configured to power the media converter; wherein the third power supply is configured to receive the first power, generate the second power, and transmit the second power to the multi-pair Ethernet cable; and wherein the fourth power supply is configured to receive the second power from the multi-pair Ethernet cable.

In another broad example aspect, an apparatus is provided, comprising: a SPE connector and a multi-pair Ethernet connector; and a subsystem configured to interface between the SPE connector and the multi-pair Ethernet connector, the subsystem comprising an isolated power supply and a non-isolated power supply. The non-isolated power supply comprises: an input power line coupled to a bypass device, a boost converter, and a voltage comparator; the voltage comparator coupled to a logic inverter and the boost converter; the logic inverter coupled to the bypass device; and the bypass device and the boost converter are coupled to an output power line.

Various systems or processes have been described to provide examples of embodiments of the claimed subject matter. No such example embodiment described limits any claim and any claim may cover processes or systems that differ from those described. The claims are not limited to systems or processes having all the features of any one system or process described above or to features common to multiple or all the systems or processes described above. It is possible that a system or process described above is not an embodiment of any exclusive right granted by issuance of this patent application.

For simplicity and clarity of illustration, reference numerals may be repeated among the figures to indicate corresponding or analogous elements. In addition, numerous specific details are set forth to provide a thorough understanding of the subject matter described herein. However, it will be understood by those of ordinary skill in the art that the subject matter described herein may be practiced without these specific details. In other instances, well-known methods, procedures, and components have not been described in detail so as not to obscure the subject matter described herein.

As used herein, an element or feature introduced in the singular and preceded by the word "a" or "an" should be understood as not necessarily excluding the plural of the elements or features. Further, references to "one example" or "one embodiment" are not intended to be interpreted as excluding the existence of additional examples or embodiments that also incorporate the described elements or features. Reference herein to "example" means that one or more feature, structure, element, component, characteristic and/or operational step described in connection with the example is included in at least one embodiment and/or implementation of the subject matter according to the subject disclosure. Thus, the phrases "an example," "another example" and similar language throughout the subject disclosure may, but do not necessarily, refer to the same example. Further, the subject matter characterizing any one example may, but does not necessarily, include the subject matter characterizing any other example.

Unless explicitly stated to the contrary, examples or embodiments "comprising" or "having" or "including" an element or feature or a plurality of elements or features having a particular property may include additional elements or features not having that property. Also, it will be appreciated that the terms "comprises", "has", "includes" means "including but not limited to" and the terms "comprising", "having" and "including" have equivalent meanings.

As used herein, the term "and/or" can include any and all combinations of one or more of the associated listed elements or features.

The terms "coupled" or "coupling" as used herein can have several different meanings depending in the context in which these terms are used. For example, the terms coupled or coupling can have a mechanical, electrical or communicative connotation. For example, as used herein, the terms coupled or coupling can indicate that two elements or devices are directly connected to one another or connected to one another through one or more intermediate elements or devices via an electrical element, electrical signal, or a mechanical element depending on the particular context. Furthermore, the term "operatively coupled" may be used to indicate that an element or device can electrically, optically, or wirelessly send data to another element or device as well as receive data from another element or device.

Reference herein to "configured" denotes an actual state of configuration that fundamentally ties the element or feature to the physical characteristics of the element or feature preceding the phrase "configured to."

Unless otherwise indicated, the terms "first," "second," etc. are used herein merely as labels, and are not intended to impose ordinal, positional, or hierarchical requirements on the items to which these terms refer. Moreover, reference to a "second" item does not require or preclude the existence of a lower-numbered item (e.g., a "first" item) and/or a higher-numbered item (e.g., a "third" item).

As used herein, the terms "approximately" and "about" represent an amount close to the stated amount that still performs the desired function or achieves the desired result. For example, the terms "approximately" and "about" may refer to an amount that is within engineering tolerances that would be readily appreciated by a person skilled in the art.

Although embodiments have been described above with reference to the accompanying drawings, those of skill in the art will appreciate that variations and modifications may be made without departing from the scope thereof as defined by the appended claims.

What is claimed is:

1. An apparatus comprising:
    an electronics subsystem comprising a Single Pair Ethernet (SPE) connector and a multi-pair Ethernet connector, the electronics subsystem configured to convert data transmitted between the SPE connector and the multi-pair Ethernet connector;
    a galvanically isolated Power Over Data Line (PoDL) power supply configured to receive a first electrical power that has been transmitted through the SPE connector, and the galvanically isolated PoDL power supply configured to power the electronics subsystem; and
    a non-isolated Power Over Ethernet (POE) power supply configured to receive the first electrical power that has been transmitted through the SPE connector, and the non-isolated PoE power supply configured generate and supply a second electrical power for transmission out from the multi-pair Ethernet connector;
    wherein the non-isolated PoE power supply comprises:
    an input power line coupled to a bypass device, a boost converter, and a voltage comparator;
    the voltage comparator coupled to a logic inverter and the boost converter;
    the logic inverter coupled to the bypass device; and
    the bypass device and the boost converter are coupled to an output power line.

2. The apparatus of claim 1, wherein the electronics subsystem further comprises:

a first transformer coupled to the SPE connector;
a first PHY device coupled to the first transformer;
a second PHY device coupled to the first PHY device;
a second transformer coupled to the second PHY device;
the multi-pair Ethernet connector coupled to the second transformer;
a clock coupled to the first PHY device and the second PHY device;
a PoDL controller coupled to the SPE connector;
a PoE controller coupled to the second transformer;
wherein the galvanically isolated PoDL power supply is coupled to the PoDL controller, the first PHY device, the second PHY device and the clock; and
wherein the non-isolated PoE power supply is coupled to the PoE controller and to the PoDL controller.

3. The apparatus of claim 1, wherein the voltage comparator is configured to compare an incoming voltage value of the input power line with a threshold voltage value.

4. The apparatus of claim 1, wherein the input power line is associated with an input voltage range, the output power line is associated with an output voltage range, and the input voltage range partially overlaps the output voltage range.

5. A system comprising the apparatus of claim 1, the system further comprising:
a first Ethernet device coupled to the apparatus through a SPE cable that is connected to the SPE connector of the apparatus, the first Ethernet device comprising a second galvanically isolated PoDL power supply;
a second Ethernet device coupled to the apparatus through a multi-pair Ethernet cable that is connected to the multi-pair Ethernet connector of the apparatus, the second Ethernet device comprising a second isolated PoE power supply; and
an external power supply is coupled to the first Ethernet device, and the external power supply powers the first Ethernet device, the apparatus, and the second Ethernet device.

6. An apparatus comprising:
an electronics subsystem comprising a Single Pair Ethernet (SPE) connector and a multi-pair Ethernet connector, the electronics subsystem configured to convert data transmitted between the SPE connector and the multi-pair Ethernet connector;
a galvanically isolated power supply and a non-isolated power supply; and
wherein the non-isolated power supply comprises:
an input power line coupled to a bypass device, a boost converter, and a voltage comparator;
the voltage comparator coupled to a logic inverter and the boost converter;
the logic inverter coupled to the bypass device; and
the bypass device and the boost converter are coupled to an output power line.

7. The apparatus of claim 6, wherein the voltage comparator is configured to compare an incoming voltage value of the input power line with a threshold voltage value.

8. The apparatus of claim 6, wherein the input power line is associated with an input voltage range, the output power line is associated with an output voltage range, and the input voltage range partially overlaps the output voltage range.

* * * * *